(12) United States Patent
Applebaum et al.

(10) Patent No.: US 7,103,553 B2
(45) Date of Patent: Sep. 5, 2006

(54) ASSISTIVE CALL CENTER INTERFACE

(75) Inventors: Ted Applebaum, Santa Barbara, CA (US); Jean-Claude Junqua, Santa Barbara, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 594 days.

(21) Appl. No.: 10/454,716

(22) Filed: Jun. 4, 2003

(65) Prior Publication Data
US 2004/0249636 A1    Dec. 9, 2004

(51) Int. Cl.
*G10L 15/00* (2006.01)

(52) U.S. Cl. .......................... 704/275; 704/9; 704/235

(58) Field of Classification Search ................. 704/9, 704/275, 235
See application file for complete search history.

(56) References Cited

U.S. PATENT DOCUMENTS

| | | | |
|---|---|---|---|
| 5,577,165 A * | 11/1996 | Takebayashi et al. ....... | 704/275 |
| 5,587,903 A * | 12/1996 | Yale ............................... | 704/9 |
| 5,864,848 A | 1/1999 | Horvitz et al. | |
| 6,304,848 B1 * | 10/2001 | Singer .......................... | 705/3 |
| 6,330,499 B1 | 12/2001 | Chou et al. | |
| 6,346,952 B1 | 2/2002 | Shtivelman | |
| 6,510,414 B1 | 1/2003 | Chaves | |
| 6,587,830 B1 * | 7/2003 | Singer .......................... | 705/3 |

\* cited by examiner

*Primary Examiner*—Daniel Abebe
(74) *Attorney, Agent, or Firm*—Harness, Dickey & Pierce, PLC

(57) ABSTRACT

Unstructured voice information from an incoming caller is processed by automatic speech recognition and semantic categorization system to convert the information into structured data that may then be used to access one or more databases to retrieve associated supplemental data. The structured data and associated supplemental data are then made available through a presentation system that provides information to the call center agent and, optionally, to the incoming caller. The system thus allows a call center information processing system to handle unstructured voice input for use by the live agent in handling the incoming call and for storage and retrieval at a later time. The semantic analysis system may be implemented by a global parser or by an information retrieval technique, such as latent semantic analysis. Co-occurrence of keywords may be used to associate prior calls with an incoming call to assist in understanding the purpose of the incoming call.

35 Claims, 5 Drawing Sheets

ASSISTIVE CALL CENTER INTERFACE

BACKGROUND OF THE INVENTION

The present invention relates generally to telephone call processing systems and call center applications. More specifically, the invention relates to a call center information processing system that is capable of processing unstructured voice input from an incoming caller.

Currently, when a caller is connected to a call center agent, only limited information about the purpose of the call is available to the agent. Callers to call centers typically spend considerable time on hold, while waiting to talk to a call center agent. Currently some call center systems may prompt the caller for specific information while the caller is waiting to talk to an agent. The caller may be asked to enter the information by touch-tone response or by voice, which would be then interpreted by an automatic speech recognition system. While this is a step in the right direction, this conventional approach allows only structured information entry. In other words, the user's response is made with respect to a particular question or topic that the call center system knows about in advance. Currently there is no effective way of accepting and using unstructured voice responses from the caller.

The present invention addresses this shortcoming of conventional systems. It supports the reduction of work by call center agents by capturing unstructured voice information from incoming callers. The system has an input port that is adapted for coupling to a call center telephone switch through which unstructured voice input from an incoming caller is received. An automatic speech recognition system, receptive of the unstructured voice input, converts the unstructured voice input into unstructured text data. Then, a semantic categorization system, receptive of the unstructured text data, converts the unstructured text data into structured data. The semantic categorization system can employ a parsing system or a latent semantic analysis system.

The parsing system may utilize local parsers for keywords, which are entered manually or found automatically via latent semantic analysis, for example.

The latent semantic analysis system, used as an alternative to the parsing system, associates the unstructured text data to different keyword categories using a latent semantic analysis engine.

A data management system then receives the structured data and accesses at least one database of supplemental or relational data to form associations between the structured data and the supplemental data. A presentation system communicates with the data management system for providing information to a call center agent based on the structured data, the supplemental data, or both. The presentation system may also be configured to access and supply other data in addition to said structured data and said supplemental data, including, for example, relational data, tabular data, audio/video data, and graphical data.

The data collection phase may occur either before or during the time the caller is connected to a call center agent. Search results are processed to add additional information and this information may be displayed by either visual presentation or audible presentation.

In one presently preferred embodiment the system display provides a running transcript of speech with keywords highlighted. Alternatively, a list of transcribed keywords may be provided, showing the surrounding text to allow the call center agent to understand the context under which the keywords were spoken. The database access allows product or service information relating to keywords found in the caller's speech to be displayed or presented in auditory form on a second audio channel, for example.

As will be more fully explained herein, the call center information system provides a rich mechanism for transferring expertise between call center agents. If a user provides an unstructured request and if the system does know what information to bring up, but the call center agent does, the appropriate database queries identified by the call center agent can be stored along with the transcript of the call. The next time a similar request is spoken, either by the original incoming caller or another caller, the system will bring up relevant information from the call center agent who handled the first call. In this way, the expertise of the call center agent is stored for later use by that agent, or another agent, who may be asked to handle a call of a similar nature.

The system thus has the ability to characterize incoming calls, by parsing and tagging. Parsing (or tagging) may be performed against a set of predetermined keywords. These can be either manually assigned by a system operator, or learned using latent semantic analysis. The system also has the ability to compare an incoming call with prior calls, by finding similar calls using a semantic distance measure.

For a more complete understanding of the invention, its objects and advantages, refer to the remaining specification and to the accompanying drawings.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1A:
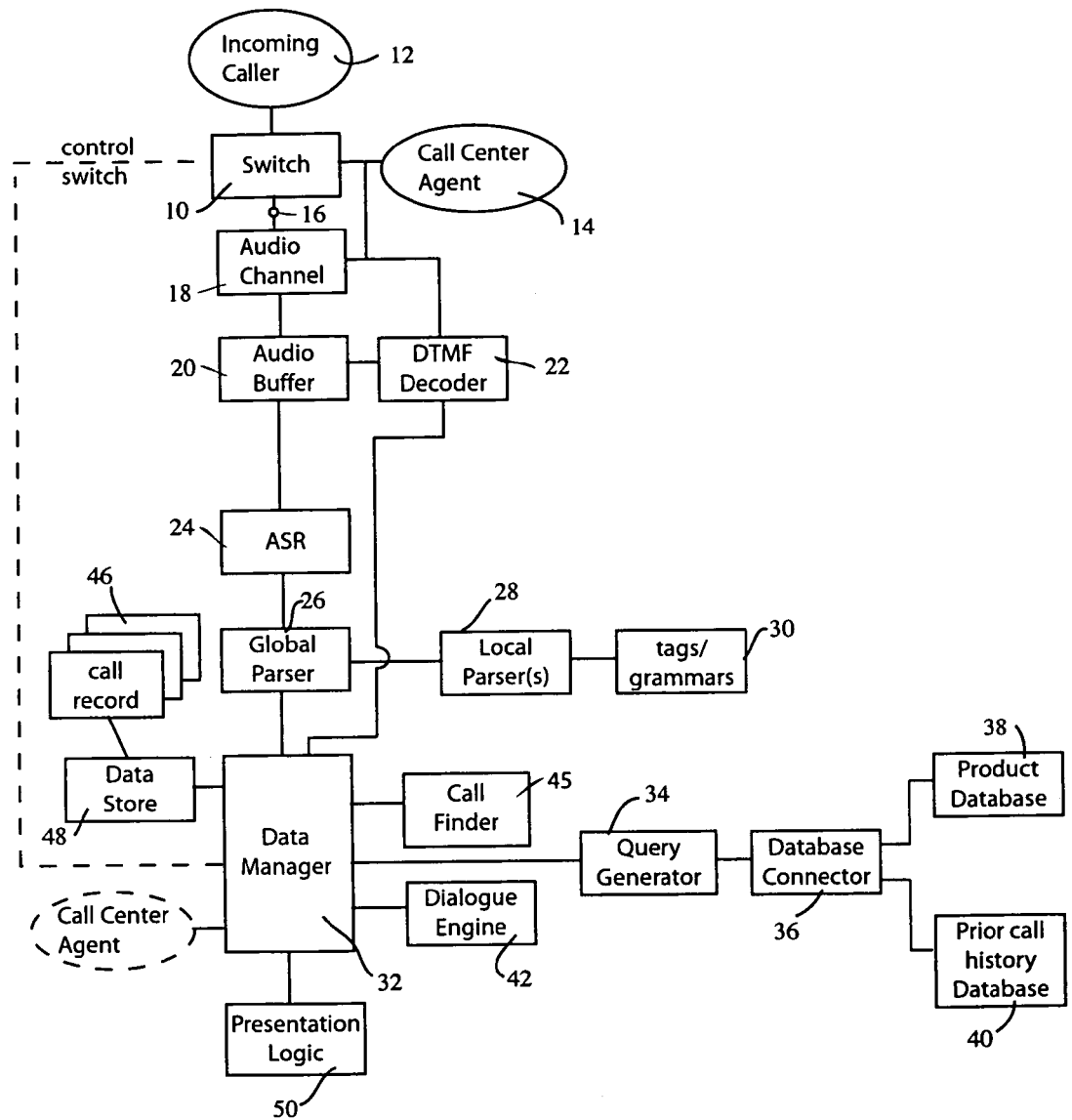
FIGS. 1A and 1B are block diagrams of two presently preferred implementations of the call center interface system.
Figure 1B:
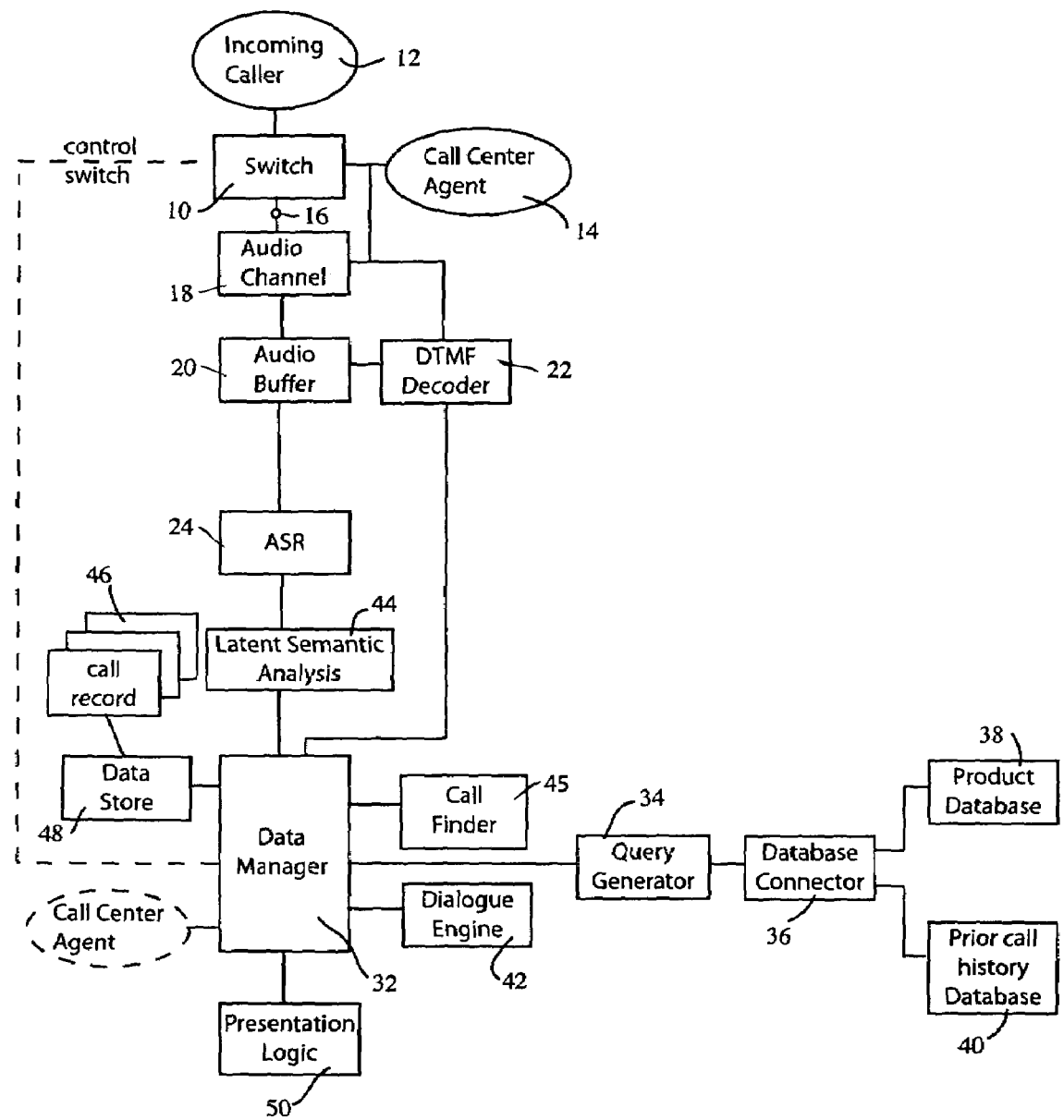

Referring to FIGS. 1A and 1B, two exemplary embodiments of the call center interface system are illustrated in conjunction with a call center telephone switch 10. Switch 10 is adapted to receive telephone calls from an incoming caller 12, and to route such calls to a call center agent 14. In addition, in accordance with the invention, an input port 16 is provided whereby the call center information processing system of the invention may be coupled to switch 10, or integrated into switch 10, to receive unstructured voice input from the incoming caller 12 and also to receive touch-tone (DTMF) codes input by the incoming caller 12.

Input port 16 communicates with the audio channel 18 of the call center information processing system. An audio buffer circuit 20, coupled to audio channel 18, stores a predetermined quantity of the incoming caller's unstructured voice input, and any optionally entered DTMF codes, so that such input can be processed by the system as processing bandwidth becomes available. To process DTMF codes, a DTMF decoder 22 is provided. This decoder may be coupled to the audio channel 18, to the audio buffer 20, or directly to switch 10. The DTMF decoder functions to convert DTMF tones input by the incoming caller into data that may be further processed by the information processing system.

An automatic speech recognition system 24 is coupled to receive unstructured voice input from the audio buffer 20. The automatic speech recognition system converts the unstructured voice input into unstructured data, such as text data, corresponding to the spoken words uttered by the incoming caller and as recognized by the automatic speech recognition (ASR) system. This unstructured data is then fed to a semantic categorization system, which can be implemented either using a parser system, illustrated in FIG. 1A, or using a latent semantic analysis engine, illustrated in FIG. 1B.

Referring to FIG. 1A, the parser system functions as a means of characterizing the call according to a plurality of potential categories. These potential categories can be established in several ways. They may be manually entered by an operator, or optionally found using a semantic analysis method, such as by using the latent semantic analysis engine 44 as will be described more fully below. The parser system implementation employs a global parser 26 that parses the input text data into semantic categories for classifying calls (e.g., complaint, product query, store location, etc.). The global parser 26 may be assisted in its parsing task by one or more local parsers 28. These function to associate with the input a set of syntactic tags (like, phone-number, address, product-ID, etc.). Thus the potential semantic categories are defined in terms of sets of syntactic tags 30. A call is classified into semantic categories (by the global parser), which consists of sets of keywords which characterize the call. The keywords are syntactic tags (which may be assigned by the local parsers).

Thus, the matching of a call to the categories is done by global parser 26, which may rely on local parsers 28 (or taggers), having an associated data stores of parser tags and/or grammars 30 to identify complex features such as dates or product identifiers. The global parser takes into consideration the dependencies between the features found by local parsers (which may be simple keyword spotters). In FIG. 1A, the collection of local parsers is illustrated collectively at 28.

Global parser 26 performs the basic operation of characterizing the incoming call. In a simple embodiment, parsing may entail simple keyword extraction. In general however, and in a presently preferred embodiment, global parser 26 uses a hierarchical strategy. In this strategy, local features (such as data or product number) are identified by specialized local parsers (or "taggers") and more complex relationships, including the dependencies between the features found by the local parsers, may be identified by a global parser (or global "tagger"). The output of global parser 26 represents structured data. In this respect, the data are structured according to the assigned semantic categories or labels developed by the global parser 26. For more information about local and global parsers, reference may be had to U.S. patent application Ser. No. 09/287,810, "Method and Apparatus for Natural Language Parsing Using Multiple Passes and Tags," hereby incorporated by reference.

In the alternative to a parsing system, shown in FIG. 1B, the semantic categorization system of the invention may be implemented using automatic methods such as by using semantic analysis methods. In this regard, use of a latent semantic analysis engine is one presently preferred way of performing such analysis methods. The latent semantic analysis engine employs a latent semantic indexing retrieval model. The preferred embodiment of such engine may be implemented using the Panasearch system available from Matsushita Electric Industrial, Ltd., Osaka, Japan. The latent semantic analysis engine, illustrated at 44 analyzes the text data from the ASR system 24 and uses latent semantic clustering to associate the input text data to semantic categories.

Although the latent semantic analysis engine has been illustrated here, other semantic analysis methods, which may use other information retrieval models, may also be employed. Such information retrieval models include Boolean retrieval models, such as fuzzy or extended Boolean models; vector retrieval models, such as algebraic models, including generalized vector models, latent semantic index models and neural network models; and probabilistic retrieval models, such as inference network models and belief network models. Accordingly, wherever the latent semantic analysis engine has been illustrated and described throughout this document, those skilled in the art will recognize that methods employing any of the above-described information retrieval models may be used instead.

The latent semantic analysis engine serves to both determine the categories and classify the incoming calls. With regard to the former, the latent semantic analysis engine may be used to automatically generate categories used by the parsing system.

Once structured data are generated by global parser 26, or by the latent semantic analysis engine, the data manager subsystem 32 is used to operate upon, and further enhance the quality and information content of the structured data. Data manager 32 performs this task in a number of different ways. One or all of these available ways may be used to enhance the structured data as will now be described.

Data manager 32 employs an associated query generator 34 that may be connected through a suitable database connector 36 to a plurality of different databases. In the embodiments illustrated in FIGS. 1A and 1B database connector 36 is shown connected to a product database 38 and to a prior call history database 40. These two databases are merely examples of what is possible. Any of a variety of different databases may be connected to the database connector 36, including databases that are accessible via the internet. The data manager 32 uses query generator 34 to construct queries based on selected keywords extracted by the global parser 26. This is done to identify additional information related to the incoming caller's unstructured voice input. An example of the use of query generator 34 will be provided later in connection with FIGS. 2 and 3.

Data manager 32 also includes a dialog engine 42 that may be invoked to elicit additional voice input from the incoming caller. Data manager 32 uses the dialog engine when the global parser 26 has not been able to supply a sufficient number of keywords for use with the query generator 34. This may occur, for example, where the incoming caller's speech is not sufficiently recognized by ASR 24, or where sufficient keywords are not able to be extracted from the unstructured data by the global parser 26. The data manager, nevertheless, uses the information it has received from parser 26 to allow dialog engine 42 to generate prompts to the user that are calculated to induce the incoming caller to supply enough additional voice input to yield meaningful keywords.

In some instances, the live call center agent 14 may be either communicating with the incoming caller 12 or monitoring the transcript of the incoming call, to allow that agent to assign keywords or other metadata to the information received via global parser 26. The presently preferred embodiment thus allows a call center agent to augment the structured data by adding or associating additional supplemental data to the call record.

In a presently preferred embodiment data manager 32 may also employ a call finder system 45 that is able to place the incoming caller's information content in a semantic space in which it can be compared with records of previously processed calls that are stored as call records 46 within a data store 48. The call finder system determines the semantic distance through a suitable distance measure and is able to identify other previously processed calls that are similar. The similarity between calls may be assessed based on co-occurrence of keywords and/or by closeness in semantic space identified by the call finder system. In this way, if an incoming caller's unstructured voice input is insufficient to formulate a suitable query, call records of prior calls of a similar nature can be consulted and that information used to assist in the query generation process. In the presently preferred embodiment, data manager 32 manages data store 46.

Data manager 32 also has associated presentation logic 50 that is used to generate various displays and audio reports to both the call center agents and optionally to the incoming caller. Reports to the call center agents may include, for example, a running transcript of the recognized speech from the incoming caller, with keywords highlighted. Additionally, the reports may include transcribed speech sections corresponding to different keywords and the associated or surrounding words that were used by the caller within the unstructured voice input. In addition, the presentation logic can supply product or service information related to the keywords found in the caller's speech. The presentation logic can be configured to provide a visual display, such as on a computer display screen, or an audio presentation on a secondary audio channel, for example.

Figure 2:
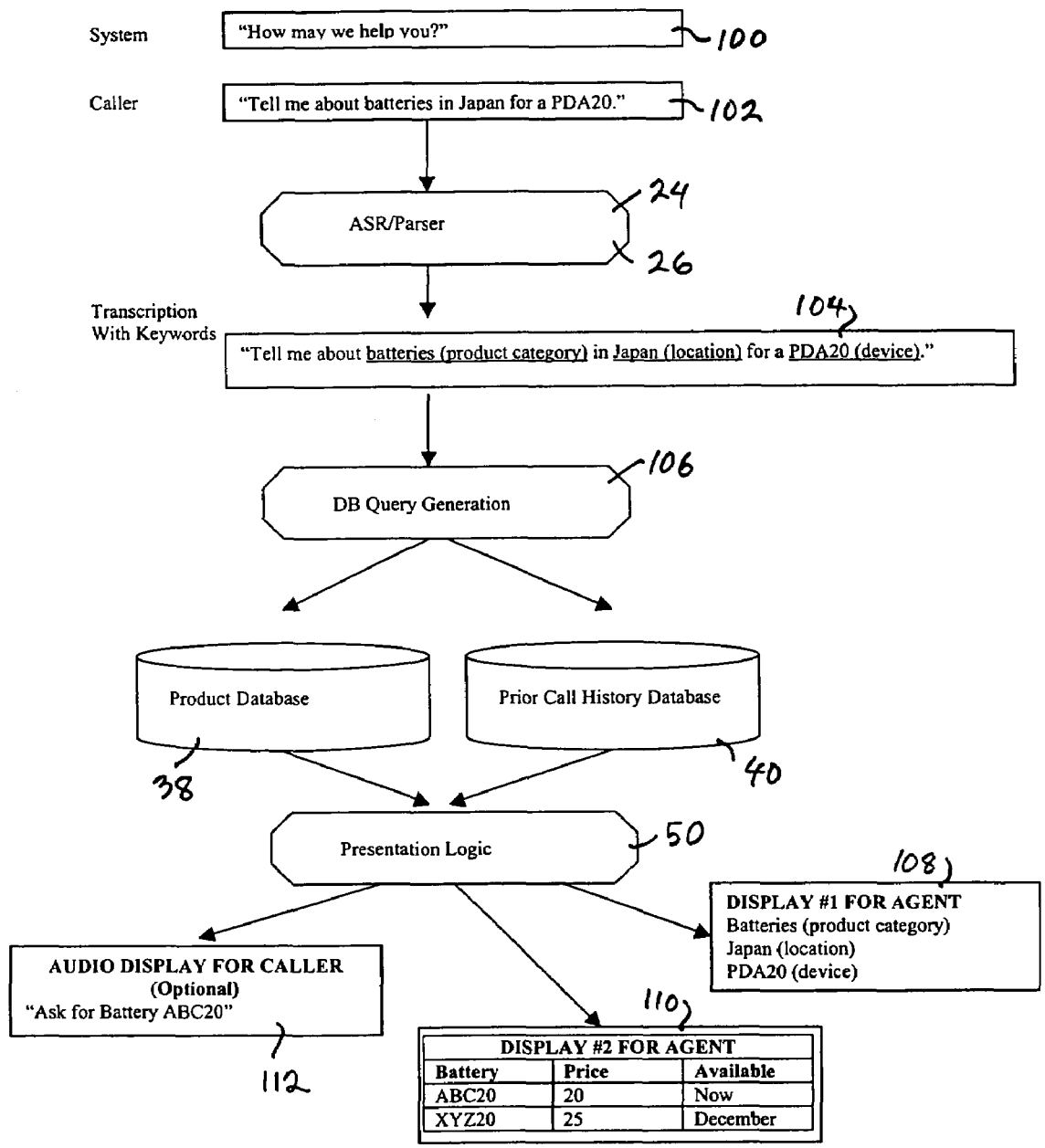
FIG. 2 is a flow chart diagram illustrating a first example of the call center interface in use.
Figure 3:
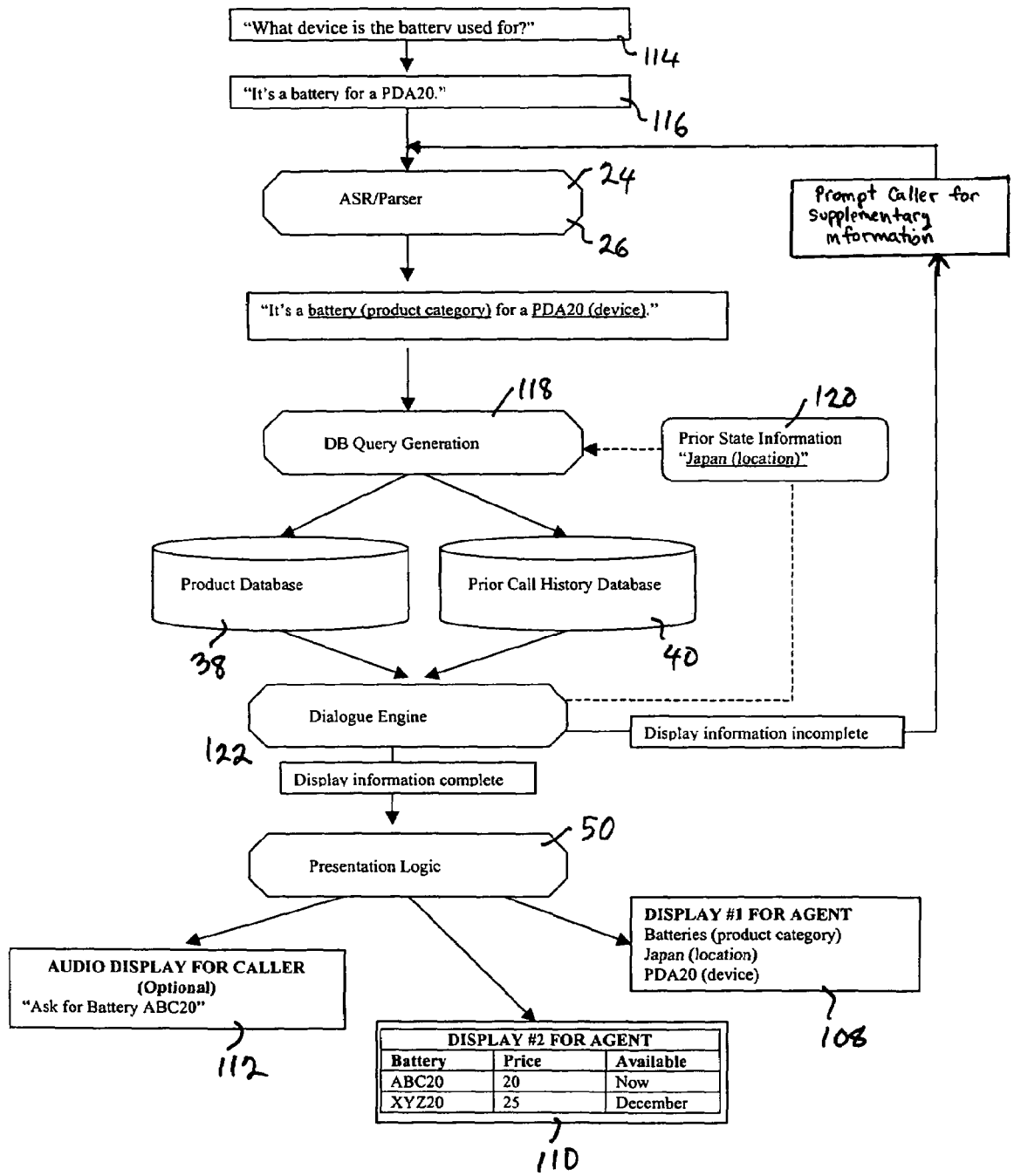
FIG. 3 is a flow chart diagram illustrating a second example of the call center interface in use.

To more fully understand the invention and its operation, examples of the system in use will now be provided in connection with FIGS. 2 and 3. Referring first to FIG. 2, the incoming caller is connected to the call center information processing system. The system initiates a dialog with the incoming caller by a suitable synthesized voice prompt issued by dialog engine 42 (FIG. 1), such as "How may we help you?" This is illustrated at step 100. The incoming caller then utters an unstructured voice input message at 102, "Tell me about batteries in Japan for a PDA 20."

The ASR system 24 (FIG. 1) and the global parser 26 (FIG. 1) operate upon this unstructured voice input to extract keywords from the utterance and assign semantic categories to those keywords. As illustrated at 104, the processed input, now representing structured data, may be represented as follows:

"Tell me about batteries(productcategory) in Japan(location) for a PDA20(device)."

From the above it can be seen that the keywords batteries, Japan and PDA 20 are extracted and semantic labels (product category), (location) and (device) have been added by the parser. Next a database query is generated at 106 and this query is sent to search two databases, product database 38 and prior call history database 40. The results obtained from both searches are then supplied to the presentation logic 50 for suitable presentation to the call center agent, or optionally also to the incoming caller. In the illustration of FIG. 2, three separate exemplary displays have been provided. The displays may be for the same call agent or different call agents. For purposes of illustration here, display 108 is intended for call center agent #1. This display simply lists the keywords extracted and their associated semantic labels. Display 110, intended for a second call center agent #2 is in the form of a spreadsheet giving the additional product information responsive to the incoming caller's request. In this example, various products, their prices and shipping availability are listed. Finally, display 112 is intended for the incoming caller. The "display" may be in visual form or in audio form. When in audio form, the presentation logic will generate a message sent by synthesized speech via dialog engine 42, giving the caller a recommendation: "Ask for battery ABC 20."

The dialogue engine 42 may be configured so that it retains the context of a previous voice input, so that it can continue to engage the user in productive voice responses. For example, if the initial response of the user is, "I need a battery in Japan," the dialogue engine generates a voice prompt to the user, such as, "What device is the battery used for?" The dialogue engine can keep track of previously entered values, such as the caller's location, and this stored information can be used to control how the dialogue will progress.

FIG. 3 demonstrates this through a further example of the system in use. In this example the user has asked for batteries using the following utterance, "I need a battery in Japan." At this stage, the system is unable to determine precisely what battery the user is requesting information about. However, the system is able to determine and store relevant location information (Japan). Thus, the system begins by generating a prompt using dialog engine 42 such as: "What device is the battery used for?" This is illustrated at step 114. The incoming caller then utters the answer: "It's a battery for a PDA 20." This is illustrated at step 116. The ASR system 24 and global parser 26 then process the incoming caller's speech to convert it into structured data:

"It's a battery(productcategory) for a PDA20(device)."

The structured data supplied by the user are then used to generate a query at step 118. The data manager 32 (FIG. 1) retains previously entered information that may be useful in generating the query. Thus, as illustrated here, the incoming caller's earlier utterance supplies additional structured data information, namely that the user is interested in the location Japan. This is illustrated at 120.

The query generation step 118 then proceeds to consult the appropriate databases, such as product database 38 and prior call history database 40 to supply output. The dialog engine may be invoked, as at step 122, if additional information is required before the display of information can be considered complete. Once the information is complete, it is supplied to the presentation logic 50 as previously discussed to produce displays such as displays 108, 110 and 112.

Incorporating the System in a Call Center Infrastructure

Figure 4:
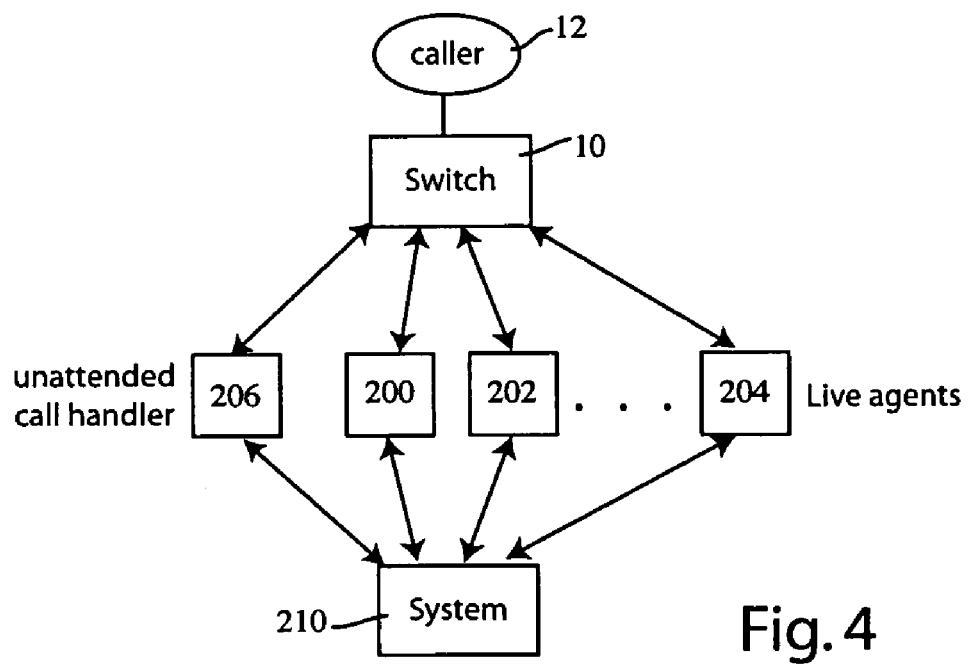
FIG. 4 is a block diagram illustrating one example of how the call center interface system may be implemented in a switched call center application.

The call center interface system of the invention can be incorporated into a call center infrastructure in a variety of ways. FIG. 4 depicts an example. Of course, other implementations are also possible within the scope of the invention. As illustrated, the switch 10 routes the incoming call from caller 12 to one or more of a series of telephone extensions. Extensions 200, 202 and 204 may be connected to live agents, whereas extension 206 may be allocated to serve as the unattended call handler associated with the call center information processing system 210 of the invention.

When all call agents are busy, the call is transferred to extension 206. As illustrated, the call center information processing system 210 supplies functionality to all of the connected extensions, including those extensions allocated to live agents and the extension allocated to the unattended call handler process.

The Information Processing Model

Figure 5:
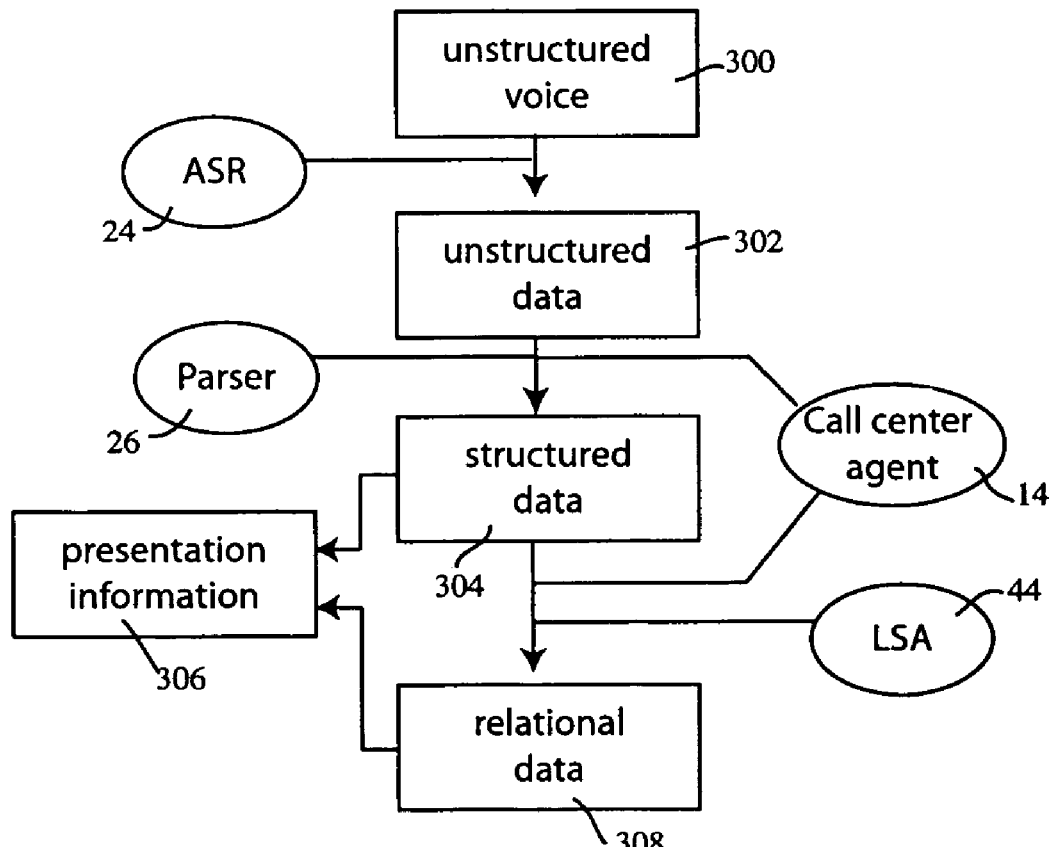
FIG. 5 is a data flow diagram illustrating how data are processed in accordance with the invention.

As has been explained above, the call center information processing system of the invention converts unstructured voice data into structured data and associated relational data through a series of information processing steps. FIG. 5 provides a data flow diagram that is useful in understanding the data transformation performed by the call center information processing system.

The incoming caller's input is initially supplied as unstructured voice input 300. The ASR system 24 converts this unstructured voice input 300 into unstructured data 302. Thereafter, global parser 26 converts the unstructured data 302 into structured data 304. The structured data 304 may be supplied at this stage to system users as presentation information 306. Such presentation is provided using the services of data manager 32 and presentation logic 50 (FIG. 1). However, in many instances, it is desirable to associate supplemental data or relational data with the structured data 304. Such supplemental or relational data is illustrated at 308 in FIG. 5.

Relationships are defined by a plurality of different processes, including using latent semantic analysis (LSA) 44 or by using input from the call center agent 14. In this respect, the call center agent is able to provide input by voice or keyboard to identify or refine database queries that are then performed to retrieve the supplemental or relational data 308. As illustrated, the call center agent 14 is also able to assist the system in converting unstructured data 302 into structured data 304. This would be done by the call center agent observing unstructured data on the screen or during listening and then allocating such unstructured data to a particular semantic category. For example, if the call center agent hears the user say the word "battery" but the ASR system fails to recognize it, the call center agent may enter this information via keyboard and thus allows the system to assign the appropriate semantic category thereafter.

Aside from its one primary use as a current call processing system, the present invention also provides a robust mechanism for transferring expertise between call center agents. If a user provides an unstructured request and the system does not know what information to bring up, but the call center agent does, the appropriate database queries can be stored along with a transcript of the call. This would be stored in data store 48 as part of a call record 46. The next time a similar request is spoken, the system will bring up the relevant information for the agent handling that call. Two similar calls may be found by a distance measure based on co-occurrence of keywords and/or closeness in a space identified by the latent semantic analysis system 44.

The present invention also serves as an important tool for preserving knowledge and to draw upon other call center agents as resources during the course of handling a call. The invention can also assist in aiding inexperienced call center agents, by allowing other, more experienced, agents to assist during the course of the call. In addition, because the call records 46 may be stored as part of a prior call history database 40, the system is also readily able to route a call from one call center agent to another without losing call context and without losing any information ascertained by the system or by a prior call center agent.

As shown in FIG. 4, data manager 32 is able to send control switching instructions to switch 10, thereby effecting the transfer of an incoming call from one call center agent to another. This transfer retains the information processed by the call center information processing system by virtue of it being stored in data store 48 and/or the prior call history database 40. In one presently preferred embodiment, data store 48 may be used to store call record information associated with a current incoming caller and/or associated with other identified prior calls that are retrieved from the prior call history database 40. Database manager 32 controls data store 48 and is able to route the contents of data store 48 to the prior call history database 40 for long term storage after the call has been completed. Of course, other data storage techniques are also possible.

While the present invention has been described in connection with presently preferred embodiments, it will be understood that the invention is capable of modification without departing from the spirit of the invention as set forth in the appended claims.

What is claimed is:

1. A call center information processing system capable of processing unstructured voice input, comprising:
   an input port adapted for coupling to a call center telephone switch through which unstructured voice input from an incoming caller is received;
   an automatic speech recognition system receptive of said unstructured voice input and operative to convert said unstructured voice input into unstructured text data;
   a semantic categorization system receptive of said unstructured text data and operative to convert said unstructured text data into structured data based on features;
   a data management system receptive of said structured data and operative to access at least one database of supplemental data and to form associations between said structured data and said supplemental data;
   a presentation system communicating with said data management system for providing information to a call center agent based on at least one of said structured data and said supplemental data;
   wherein said semantic categorization system employs a parsing system; and
   wherein said parsing system employs global parser to classify a call according to semantic categories consisting of sets of keywords.

2. A call center information processing system capable of processing unstructured voice input comprising:
   an input port adapted for coupling to a call center telephone switch through which unstructured voice input from an incoming caller is received;
   an automatic speech recognition system receptive of said unstructured voice input and operative to convert said unstructured voice input into unstructured text data;
   a semantic categorization system receptive of said unstructured text data and operative to convert said unstructured text data into structured data based on features;
   a data management system receptive of said structured data and operative to access at least one database of supplemental data and to form associations between said structured data and said supplemental data;
   a presentation system communicating with said data management system for providing information to a call center agent based on at least one of said structured data and said supplemental data; and wherein said semantic categorization system employs an information retrieval model selected from the group consisting of Boolean retrieval models, vector retrieval models and probabilistic retrieval models.

3. The system of claim 2 wherein said presentation system is coupled to said call center telephone switch for providing said information to said call center agent.

4. The system of claim 2 further comprising dialog engine coupled to said data management system and operative to prompt said incoming caller to supply additional voice input.

5. The system of claim 4 wherein said dialog engine generates prompts based on at least one of said structured data and said supplemental data.

6. The system of claim 2 wherein said data management system is further operative to store said structured data as prior call records in a call history database.

7. The system of claim 6 wherein said data management system further includes a semantic analysis system to learn new features.

8. The system of claim 7 wherein said semantic analysis system employs latent semantic analysis.

9. The system of claim 2 wherein said presentation system supplies a text transcript of said unstructured voice input.

10. The system of claim 2 wherein said presentation system supplies a text transcript of said unstructured voice input having selected words highlighted based on said structured data.

11. The system of claim 2 wherein said data management system includes a stored grammar that associates semantic meaning to keywords or phrases that is used to formulate queries to the incoming caller to solicit additional voice input.

12. The system of claim 11 wherein said stored grammar is a case frame grammar.

13. The system of claim 2 wherein said presentation system provides information to plural call center agents based on at least one of said structured data and said supplemental data.

14. The system of claim 2 wherein at least one of the following recited steps is performed while an incoming call from said incoming caller is in progress:
(a) converting said unstructured voice input in to unstructured text data;
(b) converting said unstructured text data into structured data; and
(c) forming associations between said structured data and said supplemental data.

15. The system of claim 2 wherein at least one of the following recited steps is performed after completion of a call from said incoming caller:
(a) converting said unstructured voice input in to unstructured text data;
(b) converting said unstructured text data into structured data; and
(c) forming associations between said structured data and said supplemental data.

16. A call center information processing system capable of processing unstructured voice input comprising:
an input port adapted for coupling to a call center telephone switch through which unstructured voice input from an incoming caller is received;
an automatic speech recognition system receptive of said unstructured voice input and operative to convert said unstructured voice input into unstructured text data;
a semantic categorization system receptive of said unstructured text data and operative to convert said unstructured text data into structured data based on features;
a data management system receptive of said structured data and operative to access at least one database of supplemental data and to form associations between said structured data and said supplemental data;
a presentation system communicating with said data management system for providing information to a call center agent based on at least one of said structured data and said supplemental data; and
wherein said data management system further includes a similar call finder system employing a semantic distance measure.

17. The system of claim 16 wherein said semantic distance measure assesses co-occurrence frequency of keywords.

18. A call center information processing system capable of processing unstructured voice input comprising:
an input port adapted for coupling to a call center telephone switch through which unstructured voice input from an incoming caller is received;
an automatic speech recognition system receptive of said unstructured voice input and operative to convert said unstructured voice input into unstructured text data;
a semantic categorization system receptive of said unstructured text data and operative to convert said unstructured text data into structured data based on features;
a data management system receptive of said structured data and operative to access at least one database of supplemental data and to form associations between said structured data and said supplemental data;
a presentation system communicating with said data management system for providing information to a call center agent based on at least one of said structured data and said supplemental data; and
wherein said data management system is further operative to communicate with said telephone switch to effect transfer of said incoming caller to another party through said switch.

19. The system of claim 18 wherein said data management system passes context information through said telephone switch whereby said structured data and said supplemental data is made accessible by said other party as an effect of said transfer.

20. A call center information processing system capable of processing unstructured voice input comprising:
an input port adapted for coupling to a call center telephone switch through which unstructured voice input from an incoming caller is received;
an automatic speech recognition system receptive of said unstructured voice input and operative to convert said unstructured voice input into unstructured text data;
a semantic categorization system receptive of said unstructured text data and operative to convert said unstructured text data into structured data based on features;
a data management system receptive of said structured data and operative to access at least one database of supplemental data and to form associations between said structured data and said supplemental data;
a presentation system communicating with said data management system for providing information to a call center agent based on at least one of said structured data and said supplemental data; and wherein said data management system includes an input port receptive of instructions from said call center agent to alter said structured data based on knowledge of said call center agent.

21. The system of claim 20 wherein said data management system includes an input port receptive of instructions from said call center agent to alter said formed associations between said structured data and said supplemental data based on knowledge of said call center agent.

22. The system of claim 20 wherein said data management system includes an input port receptive of instructions from said call center agent to form further associations between said structured data and said supplemental data based on knowledge of said call center agent.

23. A call center information Processing system capable of processing unstructured voice input comprising:
an input port adapted for coupling to a call center telephone switch through which unstructured voice input from an incoming caller is received;
an automatic speech recognition system receptive of said unstructured voice input and operative to convert said unstructured voice input into unstructured text data;
a semantic categorization system receptive of said unstructured text data and operative to convert said unstructured text data into structured data based on features;
a data management system receptive of said structured data and operative to access at least one database of supplemental data and to form associations between said structured data and said supplemental data;
a presentation system communicating with said data management system for providing information to a call center agent based on at least one of said structured data and said supplemental data;
wherein said presentation system supplies other data in addition to said structured data and said supplemental data; and
wherein said other data are selected from the group consisting of relational data, tabular data, audio/video data, and graphical data.

24. A method of assisting call center agents based on unstructured voice input from the caller comprising:
performing automatic speech recognition upon said unstructured voice input extracted from an incoming call to generate unstructured text data;
processing said unstructured text data by semantic categorization of said unstructured text data to generate structured data that characterizes the incoming call;
forming associations between said structured data and supplemental data obtained from a data store;
presenting information to the call center agent based on at least one of said structured data and said supplemental data; and
wherein said processing is further performed using a global parser to identify relationships among said local features.

25. The method of claim 24 wherein said processing is performed using a plurality of local parsers to identify local features within said unstructured text data.

26. A method of assisting call center agents based on unstructured voice input from the caller comprising:
performing automatic speech recognition upon said unstructured voice input extracted from an incoming call to generate unstructured text data;
processing said unstructured text data by semantic categorization of said unstructured text data to generate structured data that characterizes the incoming call;
forming associations between said structured data and supplemental data obtained from a data store;
presenting information to the call center agent based on at least one of said structured data and said supplemental data; and
wherein said processing is performed using a predetermined set of features that are manually selected by a user.

27. A method of assisting call center agents based on unstructured voice input from the caller comprising:
performing automatic speech recognition upon said unstructured voice input extracted from an incoming call to generate unstructured text data;
processing said unstructured text data by semantic categorization of said unstructured text data to generate structured data that characterizes the incoming call;
forming associations between said structured data and supplemental data obtained from a data store;
presenting information to the call center agent based on at least one of said structured data and said supplemental data;
wherein said processing is performed using a predetermined set of features that are determined by an automatic semantic analysis process; and
wherein said automatic semantic analysis process employs an information retrieval model selected from the group consisting of Boolean retrieval models, vector retrieval models and probabilistic retrieval models.

28. A method of assisting call center agents based on unstructured voice input from the caller comprising:
performing automatic speech recognition upon said unstructured voice input extracted from an incoming call to generate unstructured text data;
processing said unstructured text data by semantic categorization of said unstructured text data to generate structured data that characterizes the incoming call;
forming associations between said structured data and supplemental data obtained from a data store;
presenting information to the call center agent based on at least one of said structured data and said supplemental data; and
said processing step is performed using an information retrieval model selected from the group consisting of Boolean retrieval models, vector retrieval models and probabilistic retrieval models.

29. The method of claim 28 further comprising accessing a database to obtain additional information for presentation based on said supplemental data.

30. The method of claim 29 wherein said additional information is selected from the group consisting of relational data, tabular data, audio/video data, and graphical data.

31. The method of claim 28 further comprising using at least one of said structured data and said supplemental data to identify semantically similar prior calls and to extract information about said similar prior calls from a prior call history database.

32. The method of claim 28 further comprising automatically generating a query to solicit additional voice input from the caller based on said unstructured text data.

33. The method of claim 28 further comprising transferring at least a portion of at least one of said structured data and said supplemental data to a second call center agent.

34. A method of transferring knowledge between call center agents in handling an incoming call, comprising:
- performing automatic speech recognition upon said unstructured voice input extracted from an incoming call to generate unstructured text data;
- processing said unstructured text data by semantic categorization of said unstructured text data to generate structured data that characterizes the incoming call;
- forming associations between said structured data and supplemental data obtained from a data store to define associated data;
- storing said associated data where it may be accessed by plural call agents in the handling of said incoming call; and
- wherein said processing step is performed using an information retrieval model selected from the group consisting of Boolean retrieval models, vector retrieval models and probabilistic retrieval models.

35. The method of claim 34 wherein said processing step is performed using a parsing system.

* * * * *